United States Patent
Roh et al.

(10) Patent No.: US 8,492,026 B2
(45) Date of Patent: Jul. 23, 2013

(54) RECHARGEABLE BATTERY

(75) Inventors: Sae-Weon Roh, Suwon-si (KR);
Tae-Keun Kim, Suwon-si (KR);
Nam-Soon Choi, Suwon-si (KR);
Jin-Kyu Hong, Suwon-si (KR); Jun-Sik Kim, Suwon-si (KR); Man-Seok Han, Suwon-si (KR); Sung-Soo Kim, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 593 days.

(21) Appl. No.: 12/629,175

(22) Filed: Dec. 2, 2009

(65) Prior Publication Data

US 2010/0310928 A1 Dec. 9, 2010

(30) Foreign Application Priority Data

Jun. 4, 2009 (KR) .................. 10-2009-0049640

(51) Int. Cl.
*H01M 2/08* (2006.01)
*H01M 2/00* (2006.01)

(52) U.S. Cl.
USPC ........................... 429/185; 429/163

(58) Field of Classification Search
None
See application file for complete search history.

(56) References Cited

U.S. PATENT DOCUMENTS

| 5,580,679 | A | * | 12/1996 | Tanaka ........................... 429/185 |
| 6,071,643 | A | * | 6/2000 | Chino et al. .................. 429/176 |
| 6,451,476 | B1 | * | 9/2002 | Chang et al. ................. 429/127 |
| 8,110,304 | B2 | * | 2/2012 | Suzuta ........................... 429/163 |
| 2008/0206636 | A1 | * | 8/2008 | Sanada et al. ................ 429/185 |
| 2009/0029245 | A1 | * | 1/2009 | Ibaragi et al. ................ 429/176 |

FOREIGN PATENT DOCUMENTS

| JP | 2003-187762 | 7/2003 |
| JP | 2003-272577 | 9/2003 |
| JP | 2007-265989 A | 10/2007 |
| KR | 10-2008-0015161 | 2/2008 |
| KR | 10-2008-0078160 | 8/2008 |

OTHER PUBLICATIONS

KIPO Office Action dated Sep. 24, 2010 for Korean application 9-5-2010-042099124.

* cited by examiner

*Primary Examiner* — Patrick Ryan
*Assistant Examiner* — Christopher Domone
(74) *Attorney, Agent, or Firm* — Knobbe Martens Olson & Bear LLP

(57) ABSTRACT

A rechargeable battery including a battery cell, and a battery case housing the battery cell, the battery case including a silane-based compound.

17 Claims, 5 Drawing Sheets

RECHARGEABLE BATTERY

CROSS-REFERENCE TO RELATED APPLICATION

This application claims the benefit of Korean Patent Application No. 10-2009-0049640, filed Jun. 4, 2009, in the Korean Intellectual Property Office, the disclosure of which is incorporated herein, by reference.

BACKGROUND

1. Field

The present teachings relate to a rechargeable battery.

2. Description of the Related Art

Batteries perform electrochemical redox reactions to produce electrical energy from chemical energy. Batteries can be classified as a primary battery, which is not rechargeable, or as a secondary battery, which can be recharged.

Recent developments in the high-tech electronics industry has lead to the proliferation of portable electronic devices. As a power source for such portable electronic devices, much research has been directed to developing high energy density lithium rechargeable batteries.

A lithium rechargeable battery includes a battery cell provided with a positive electrode and a negative electrode, and a battery case to house the battery cell. The battery may be classified as cylindrical, polygonal, or pouch-type, according to the shape of its case. Pouch-type rechargeable batteries have a lower surface and an upper surface, which are sealed together around the battery cell. Pouch-type batteries generally have a lighter weight than cylindrical or polygonal batteries.

In case of a pouch-type rechargeable battery, water may permeate the interface between the lower surface and the upper surface of the case. If water permeates into a battery, the reliability of the battery cell may be degraded.

SUMMARY

An aspect of the present teachings provides a rechargeable battery including a battery case that can enhance the reliability of a battery cell housed therein, by preventing water from entering the case.

In accordance with an exemplary embodiment of the present teachings, a rechargeable battery may include a battery cell, and a battery case to house the battery cell, the battery case including a silane-based compound.

According to various embodiments, the battery case may include a housing to house the battery cell, a cover to cover the housing, and at least one of the housing and the cover may include a metal layer, an insulation layer, and a moisture-resistant layer containing the silane-based compound.

According to various embodiments, the moisture-resistant layer may form an external surface of the battery case.

According to various embodiments, the moisture-resistant layer may be disposed between the metal layer and the insulation layer.

According to various embodiments, the battery case may include a sealing portion where the housing and the cover are adhered to each other, and a layer of the silane-based compound may be positioned in the sealing portion.

According to various embodiments, the silane-based compound may be positioned between the housing and the cover, in the sealing portion.

According to various embodiments, the sealing portion may be corrugated in cross-section.

According to various embodiments, a free end of the sealing portion may be bent into a U-shaped structure.

According to various embodiments, the silane-based compound may be represented by the following Chemical Formula 1.

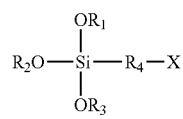

[Chemical Formula 1]

In the above Chemical Formula 1, $R_1$ to $R_3$ may be independently selected from the group consisting of hydrogen, a C1 to C10 alkyl, and an acetyl; $R_4$ is a C1 to C10 alkylene; and X is an organic functional group.

According to various embodiments, the organic functional group may be one selected from the group consisting of an amino, an epoxy, a C1 to C10 alkyl, a C1 to C10 haloalkyl, phenyl, a (meth)acryl, a dioxolanyl alkyl, a dioxanyl alkyl, a ketal, an acetal, a diacetal, a cycloacetal, a alkylideneacetal, a phenyl alkylideneacetal, a benzylidene acetal, a glycidyloxypropyl, a (meth)acryloxypropyl, and a combination thereof.

According to various embodiments, the battery case may be a pouch-type case.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects and advantages of the present teachings will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
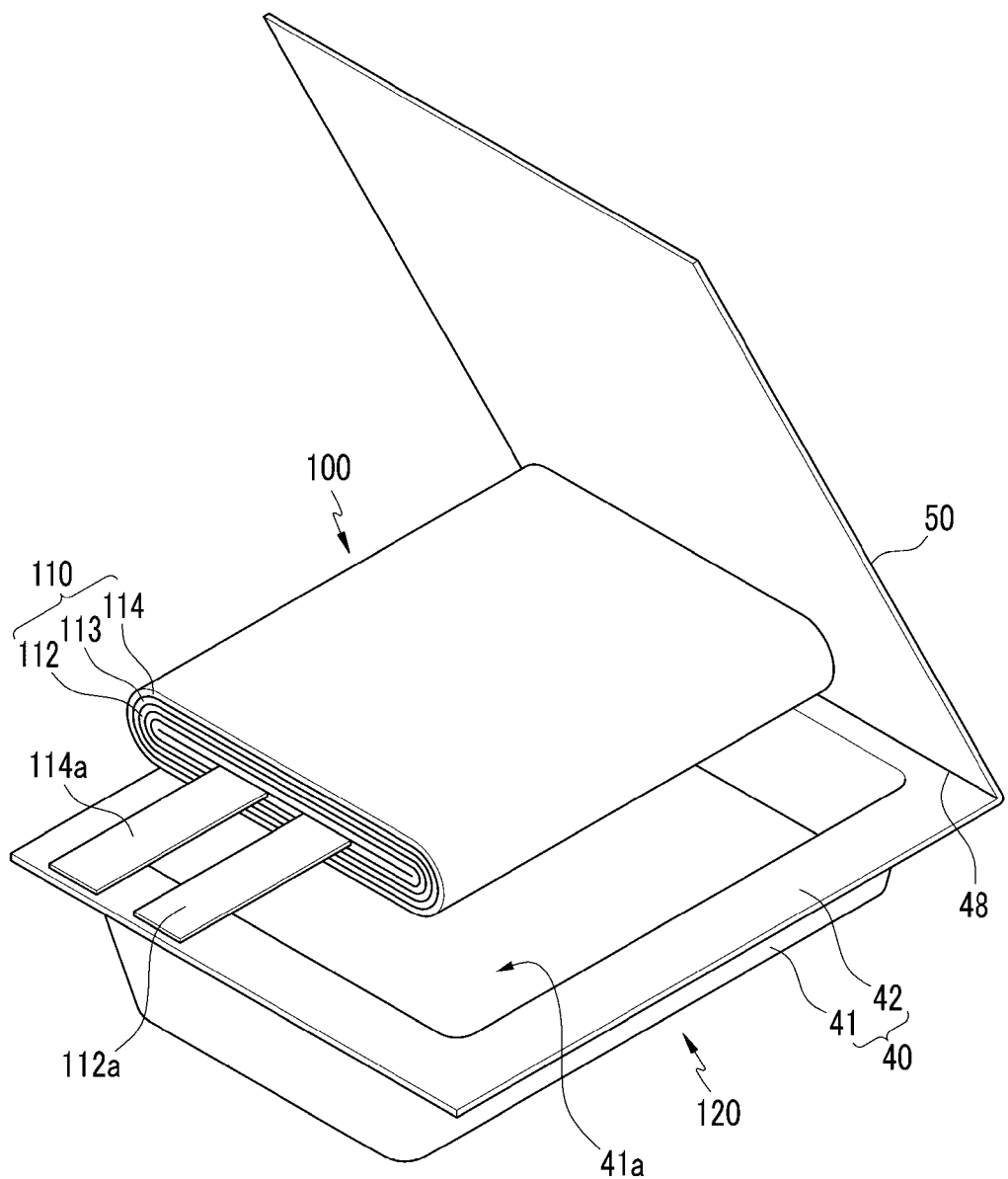
FIG. 1 is a schematic view showing a rechargeable battery, in accordance with an embodiment of the present teachings.

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures. In the figures, the thicknesses of layers, films, panels, regions, etc., may be exaggerated for clarity. It will be understood that when an element is referred to as being disposed "on" another element, it can be disposed directly on the other element, or intervening elements may also be disposed therebetween. In contrast, when an element is referred to as being disposed "directly on" another element, no intervening elements are disposed therebetween.

FIG. 1 is a schematic view showing a rechargeable battery, in accordance with an exemplary embodiment of the present teachings. Referring to FIG. 1, the rechargeable battery includes a battery cell 100 and a battery case 120 housing the battery cell 100. The battery cell 100 includes a positive electrode 114, a negative electrode 112, and a separator 113 disposed therebetween. The positive electrode 114, the negative electrode 112, and the separator 113 are immersed in an electrolyte solution (not shown). The battery includes a positive electrode tap 114a that extends from the positive electrode 114, and a negative electrode tap 112a that extends from the negative electrode 112.

The battery case 120 includes a housing 40 having an internal space 41a into which the battery cell 100 is seated, and a cover 50 to cover the housing 40, after the battery cell 100 is disposed therein. The housing 40 has a container portion 41 that at least partially defines the internal space 41a, and an edge portion 42 that extends laterally from the container portion 41.

The housing 40 and the cover 50 are folded together at a joining portion 48. The edge portion 42 of the housing 40 is attached to a corresponding portion of the cover 50. The case 120 includes a plurality of stacked layers, as described below.

Figure 2A:
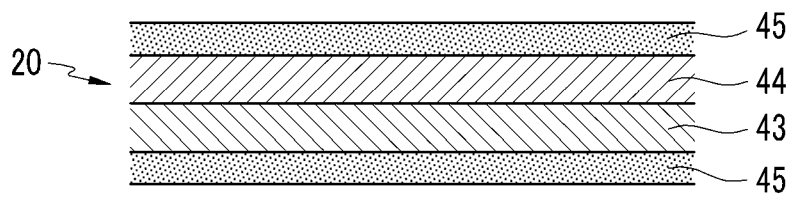
FIGS. 2A to 2C are cross-sectional views illustrating the structure of battery cases, according to various embodiments of the present teachings.
Figure 2B:
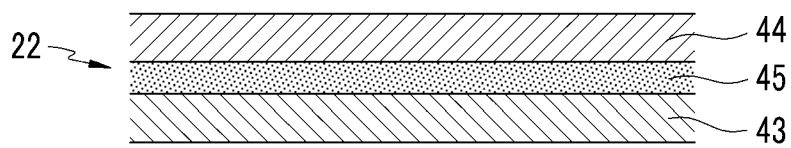
Figure 2C:
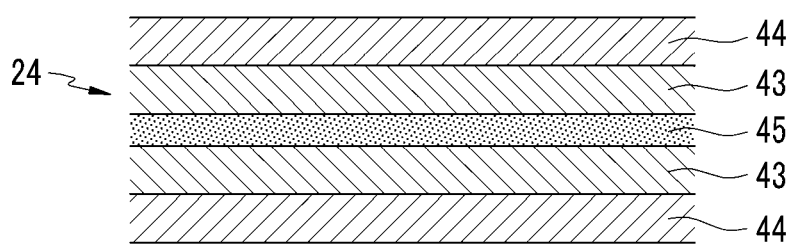

FIGS. 2A to 2C are cross-sectional views showing the stacking (laminate) structures of battery cases 20, 22, and 24, in accordance with exemplary embodiments of the present teachings. Referring to FIG. 2A, the battery case 20 includes a metal layer 43, an insulation layer 44, and a moisture-resistant layer 45. The metal layer 43 may be formed of aluminum (Al), and the insulation layer 44 may be formed of nylon or a resin such as polyethylene terephthalate (PET).

The moisture-resistant layer 45 includes a silane-based compound. The silane-based compound may be any suitable silane coupling agent. The silane-based compound may be an alkoxy silane compound represented by the following Chemical Formula 1.

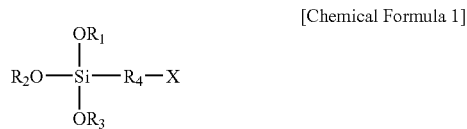

[Chemical Formula 1]

In the above Chemical Formula 1, R1 to R3 can be independently selected from the group consisting of hydrogen, a C1 to C10 alkyl, and an acetyl, R4 is a C1 to C10 alkylene, and X is an organic functional group. The organic functional group may be one selected from the group consisting of an amino, an epoxy, a C1 to C10 alkyl, a C1 to C10 haloalkyl, a phenyl, a (meth)acryl, a dioxolanyl alkyl, a dioxanyl alkyl, a ketal, an acetal, a diacetal, a cycloacetal, an alkylideneacetal, a phenyl alkylideneacetal, a benzylidene acetal, a glycidyloxypropyl, a (meth)acryloxypropyl, and a combination thereof.

The moisture-resistant layer 45 may form the external surface of the battery case 120. The moisture-resistant layer 45 prevents external moisture from entering the battery case 120. Although the figures show only one of the metal layer 43 and the insulation layer 44, the present teachings are not so limited, in that a plurality of such layers may be alternately or consecutively stacked on one another.

Referring to FIG. 2B, in the battery case 22 a moisture-resistant layer 45 is positioned between a metal layer 43 and an insulation layer 44. Referring to FIG. 2C, the battery case 24 includes two metal layers 43, a moisture-resistant layer 45 positioned between the two metal layers 43, and an insulation layer 44 is positioned so as to form the external surface of the battery case 24. The insulation layer 44 may be formed of polymer resin that may be thermally bonded, to thereby increase the sealing characteristics of the battery case 24.

The battery case 120 can have the same structure as any of the battery cases 20, 22, and 24, or any other suitable structure, so long as it includes at least one of the moisture-resistant layers 45. The relative positions and/or numbers of the various layers are not limited to the positions and/or numbers shown in the figures.

By including the moisture-resistant layer 45, which contains the silane-based compound, the battery case 120 is resistant to the penetration of external moisture. Thus, it can protect the battery cell 100 from being degraded by moisture.

The moisture-resistant layer 45 is different from a conventional moisture absorption layer, which includes a material capable of absorbing moisture. In particular, while a moisture absorption layer absorbs moisture inside a battery, it does not prevent moisture from entering a battery. Therefore, over time, moisture can accumulate in a moisture absorption layer, and thereby degrade the reliability of a battery cell. In contrast, the moisture-resistant layer 45 prevents external moisture from entering a battery, to thereby maintain the reliability of a battery cell.

Figure 3:
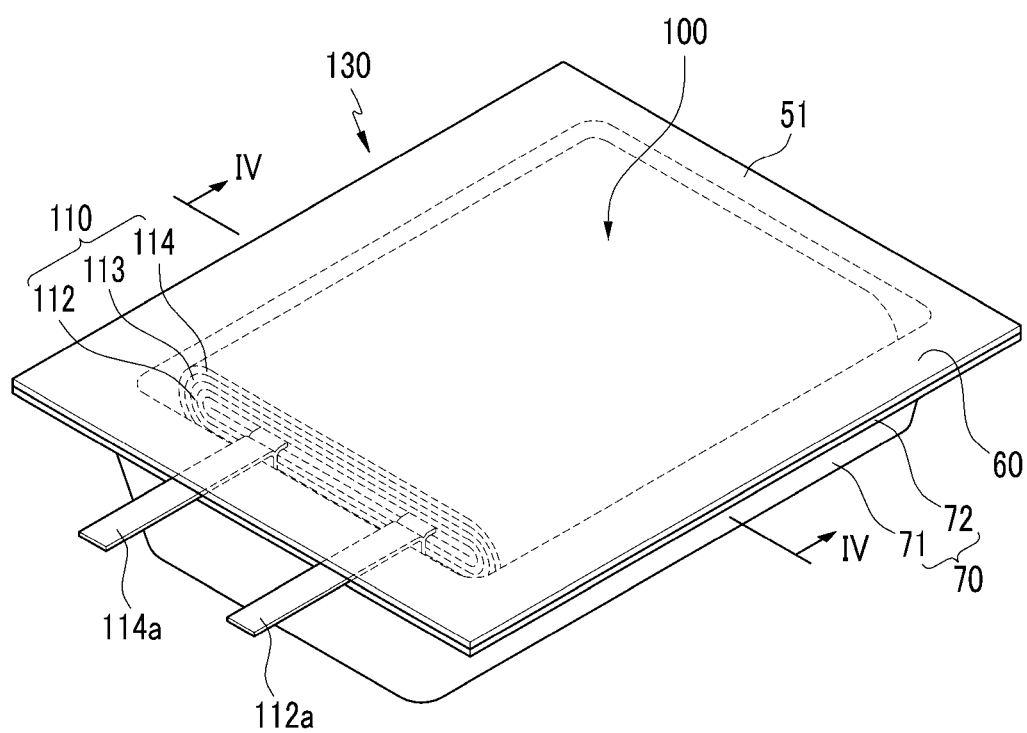
FIG. 3 is a schematic view illustrating a rechargeable battery, in accordance with another exemplary embodiment of the present teachings.
Figure 4:
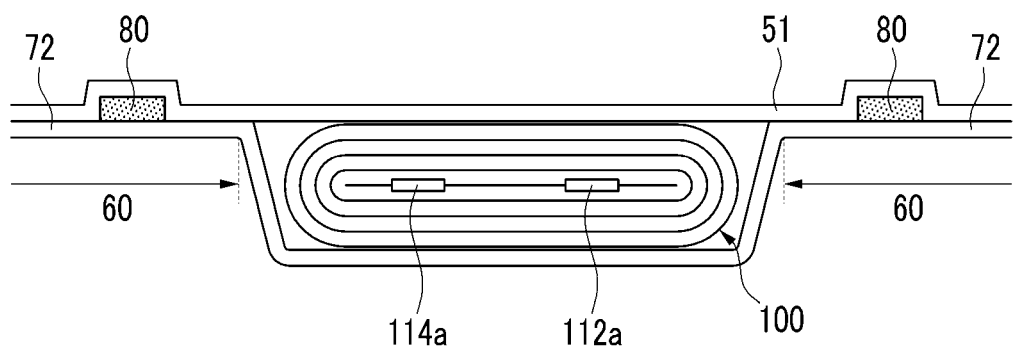
FIG. 4 shows a cross section of the rechargeable battery of FIG. 3, taken along line IV-IV.

FIG. 3 is a schematic view illustrating a rechargeable battery, in accordance with another exemplary embodiment of the present teachings. FIG. 4 shows a cross section of the rechargeable battery of FIG. 3, taken along a line IV-IV. Referring to FIGS. 3 and 4, the rechargeable battery is similar to the rechargeable battery of FIG. 1, so only the differences therebetween will be described in detail. The rechargeable battery includes a battery cell 100, which includes a positive electrode 114, a negative electrode 112, a separator 113, an electrolyte solution (not shown), a positive electrode tap 114a and a negative electrode tap 112a.

The rechargeable battery includes a battery case 130 that includes a housing 70 having a container portion 71 and an edge portion 72, and a cover 51 to cover the housing 70. The edge portion 72 of the housing 70 is brought into contact with the cover 51, and then sealed thereto, to form a sealing portion 60. The sealing portion 60 may be formed through a process such as thermal sealing, so as to hermetically seal the battery cell 100 in the battery case 130.

The rechargeable battery includes a moisture-resistant layer 80 that is disposed in the sealing portion 60. The moisture-resistant layer 80 includes the silane-based compound. In particular, the moisture-resistant layer 80 may be positioned between the edge portion 72 of the housing 70 and the cover 51, as illustrated in FIG. 4. The moisture-resistant layer 80 may be formed along the entire sealing portion 60. For example, the moisture-resistant layer 80 may be generally U-shaped, or may be circular. However, the shape and thickness of the moisture-resistant layer 80 is not so limited, as the moisture-resistant layer 80 may be formed in various shapes and thicknesses. As described above, the silane-based compound may be any suitable silane coupling agent, and it may be a chemical compound represented by the above Chemical Formula 1.

The moisture-resistant layer 80 prevents external moisture from permeating through a gap between the housing 70 and the cover 51 and thus, prevents moisture from contacting the battery cell 100. Accordingly, it is possible to prevent the battery cell 100 from being degraded by the moisture, to enhance the reliability of the battery cell 100.

Figure 5:
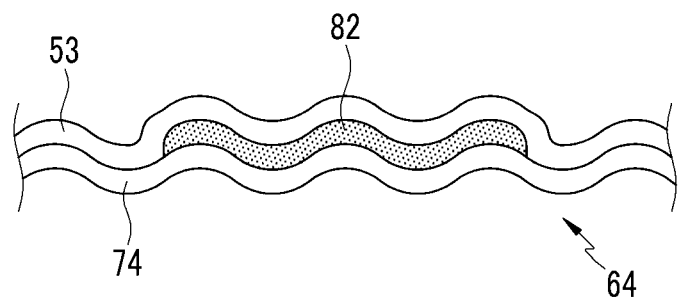
FIGS. 5 and 6 are schematic views illustrating examples of sealing portions of battery cases, according to exemplary embodiments of the present teachings.
Figure 6:
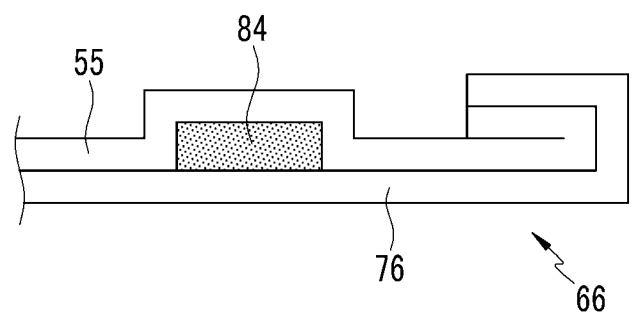

FIGS. 5 and 6 are schematic views illustrating examples of sealing portions 64 and 66 of battery cases of rechargeable batteries, according to various embodiments of the present teachings. Referring to FIG. 5, the sealing portion 64 includes an edge portion 74 of a housing, a cover 53, and a moisture-resistant layer 82 disposed therebetween. The sealing portion 64 is corrugated in cross-section. The shape of the sealing portion 64 increases the distance moisture must travel before reaching a battery cell (not shown) of the rechargeable battery. In this way, the reliability of the battery cell may be improved.

Referring to FIG. 6, the sealing portion 66 includes an edge portion 76 of a housing, a cover 55, and a moisture resistant layer 84 disposed therebetween. A free end of the sealing portion 66 is folded, so as to be U-shaped. The folding of the sealing portion 66 makes it harder for moisture to permeate between the edge portion 76 and the cover 55, to thereby improve the reliability of a battery cell of the rechargeable battery.

The battery cases shown in FIGS. 5 and 6 can include the aspects of any of the battery cases described herein. In particular, the cases can have any of the laminate structures shown in FIGS. 2A-2C.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

What is claimed is:

1. A rechargeable battery comprising:
   a battery cell; and
   a battery case surrounding the battery cell, comprising a silane-based compound;
   wherein the silane-based compound is represented by the following Chemical Formula 1:

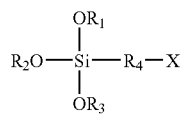

[Chemical Formula 1]

wherein in Chemical Formula 1, $R_1$ to $R_3$ are independently selected from the group consisting of hydrogen, a C1 to C10 alkyl, and an acetyl, $R_4$ is a C2 to C10 alkylene, and X is an organic functional group.

2. The rechargeable battery of claim 1, wherein the battery case comprises:
   a housing to accommodate the battery cell; and
   a cover to cover the housing,
   wherein at least one of the housing and the cover comprises a metal layer, an insulation layer, and a moisture-resistant layer comprising the silane-based compound.

3. The rechargeable battery of claim 2, wherein the moisture-resistant layer forms an external surface of the battery case.

4. The rechargeable battery of claim 2, wherein the moisture-resistant layer is disposed between the metal layer and the insulation layer.

5. The rechargeable battery of claim 2, wherein the battery case comprises a sealing portion that is where the housing and the covering are adhered to each other, and
   the silane-based compound is disposed in the sealing portion.

6. The rechargeable battery of claim 5, wherein the silane-based compound is positioned between the housing and the cover.

7. The rechargeable battery of claim 5, wherein the sealing portion is corrugated in cross-section.

8. The rechargeable battery of claim 5, wherein the sealing portion is folded into a U-shaped structure.

9. The rechargeable battery of claim 1, wherein the organic functional group is one selected from the group consisting of an amino, an epoxy, a C1 to C10 alkyl, a C1 to C10 haloalkyl, a phenyl, a (meth)acryl, a dioxolanyl alkyl, a dioxanyl alkyl, a ketal, an acetal, a diacetal, a cycloacetal, an alkylideneacetal, a phenyl alkylideneacetal, a benzylidene acetal, a glycidyloxypropyl, a (meth)acryloxypropyl, and a combination thereof.

10. The rechargeable battery of claim 1, wherein the battery case is a pouch-type case.

11. A rechargeable battery comprising:
    a battery cell; and
    a battery case surrounding the battery cell, comprising a silane-based compound represented by the following Chemical Formula 1:

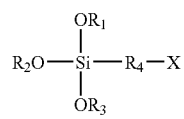

[Chemical Formula 1]

wherein $R_1$ to $R_3$ are independently selected from the group consisting of hydrogen, a C1 to C10 alkyl, and an acetyl, $R_4$ is a C2 to C10 alkylene, and X is an organic functional group.

12. The rechargeable battery of claim 11, wherein the battery case comprises: a metal layer; an insulation layer; and a moisture-resistant layer comprising the silane-based compound.

13. The rechargeable battery of claim 11, wherein: the battery case comprises, a housing to accommodate the battery cell, a cover to seal the battery unit in the housing; and a layer of the silane-based compound disposed in a sealing region formed by the sealing of the cover to the housing.

14. The rechargeable battery of claim 13, wherein the battery case comprises:
    a metal layer;
    an insulation layer; and
    a moisture-resistant layer comprising the silane-based compound.

15. The rechargeable battery of claim 12, wherein the layer of the silane-based compound is U-shaped and extends along the entire sealing region.

16. The rechargeable battery of claim 12, wherein the sealing region is corrugated, or a free end of the sealing region is folded into a U-shaped structure.

17. The rechargeable battery of claim 11, wherein the organic functional group is one selected from the group consisting of an amino, an epoxy, a C1 to C10 alkyl, a C1 to C10 haloalkyl, a phenyl, a (meth)acryl, a dioxolanyl alkyl, a dioxanyl alkyl, a ketal, a acetal, a diacetal, a cycloacetal, a alkylideneacetal, a phenyl alkylideneacetal, a benzylidene acetal, a glycidyloxypropyl, a (meth)acryloxypropyl, and acombination thereof.

* * * * *